Figure 8:
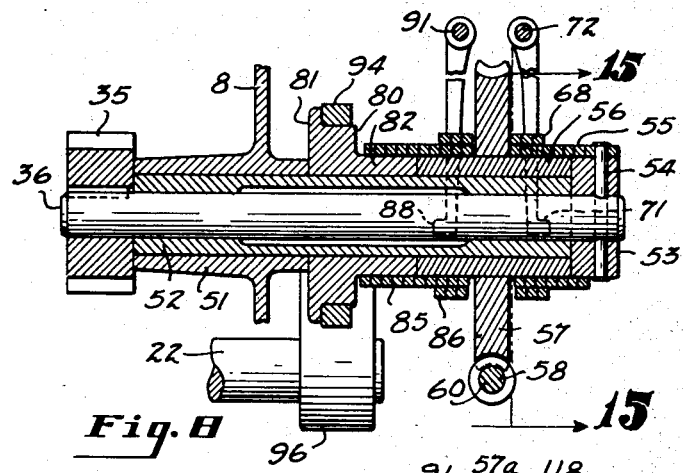

Oct. 25, 1938.  J. W. RACKLYEFT  2,134,202
CLUTCH FOR IRONING MACHINE MECHANISM
Filed Oct. 15, 1936  2 Sheets-Sheet 1
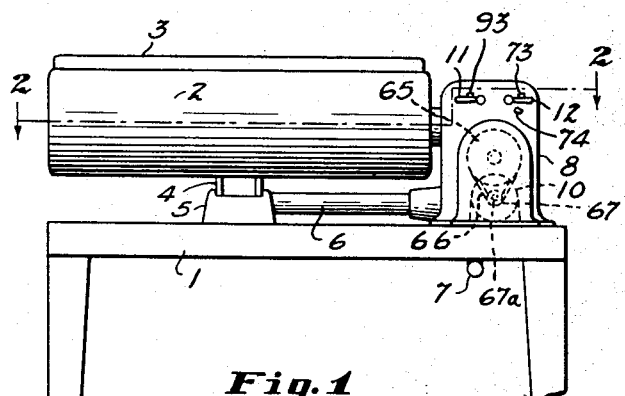
Fig. 1
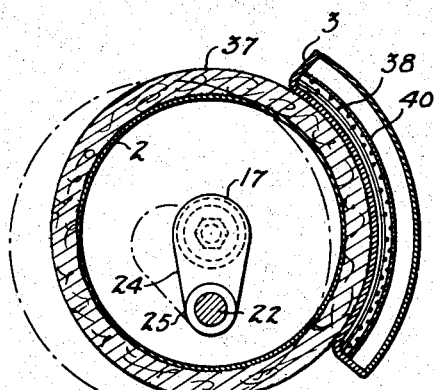
Fig. 3
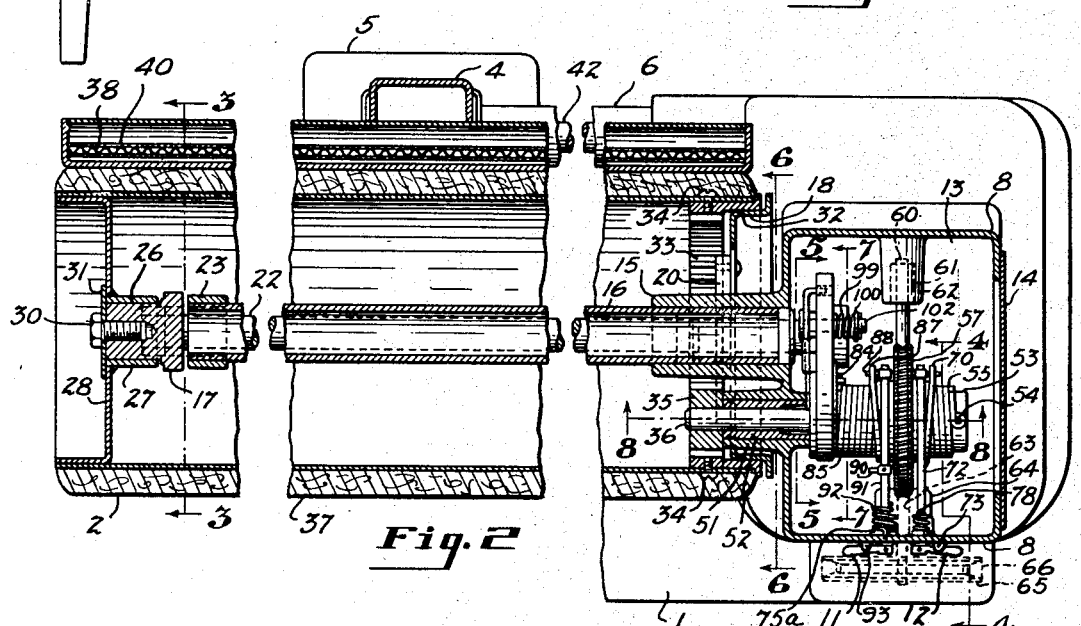
Fig. 2
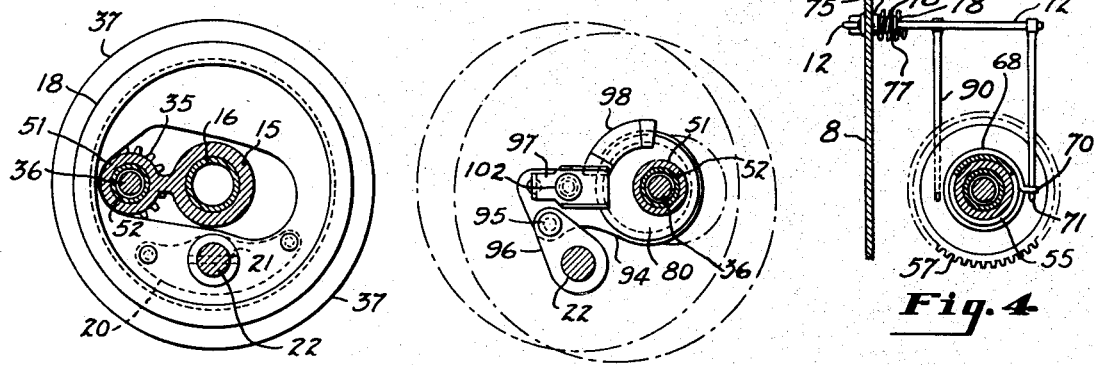
Fig. 6
Fig. 5
Fig. 4
INVENTOR
John W. Racklyeft
BY Edmund J. De Pau
his ATTORNEY Oct. 25, 1938.  J. W. RACKLYEFT  2,134,202
CLUTCH FOR IRONING MACHINE MECHANISM
Filed Oct. 15, 1936   2 Sheets-Sheet 2

INVENTOR
John W. Racklyeft
BY Edmund J. Te Pas
his ATTORNEY

Patented Oct. 25, 1938

2,134,202

UNITED STATES PATENT OFFICE 2,134,202

CLUTCH FOR IRONING MACHINE MECHANISM

John W. Racklyeft, Cleveland, Ohio, assignor to The Apex Electrical Manufacturing Company, Cleveland, Ohio, a corporation of Ohio Application October 15, 1936, Serial No. 105,771

11 Claims. (Cl. 192—26)

This invention relates to clutches and it constitutes a continuation-in-part of the invention disclosed in my copending application Serial No. 735,040 which was filed July 13, 1934 for Ironing machine mechanism.

The present invention has for its objects the provision of a simple and inexpensive, easily controlled form of friction clutch construction which is adapted to provide a positive driving connection when its cooperating driving and driven parts are in engagement with each other, such parts being adapted to be substantially free of each other when the clutch is adjusted to its disengaged position.

Other objects of the invention include the provision of a friction clutch which is substantially noiseless and positive in its operation and which utilizes an expansible member adapted to be driven by a clutch spool and arranged for coacting driving engagement with a similar clutch spool.

Another object of the invention relates to the provision of a clutch which is capable of driving relatively heavy loads and in which the engagement and disengagement of the clutch may be controlled by the exertion of a very slight effort on the part of the operator.

Another object of the invention relates to the provision of a clutch having a minimum number of moving parts whereby excessive wear of the clutch is avoided.

Another object of the invention relates to the provision of a clutch in which the parts are arranged and constructed so that they are relatively easy to manufacture and do not require close-fitting tolerances.

Another object of the invention relates to the provision of a clutch of simple and inexpensive construction which may be subjected to considerable use without appreciable wear on the operating parts of the clutch.

A further object of the invention relates to the provision of a clutch in which the clutch parts occupy a relatively small space and are arranged so that the clutch may be readily assembled and disassembled.

These and other objects of the invention will become more apparent and better understood after consideration has been given to the following detailed description of the invention taken in connection with the drawings which show, merely by way of illustration, structure adapted for carrying out the objects of the invention.

Figure 7:
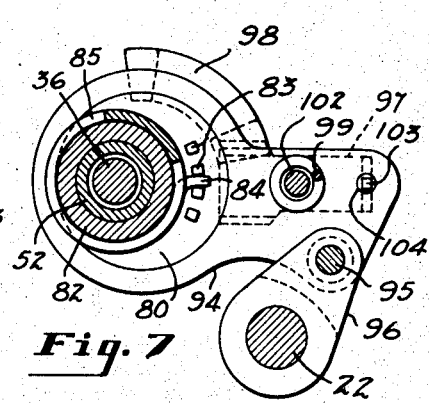
Figure 9:
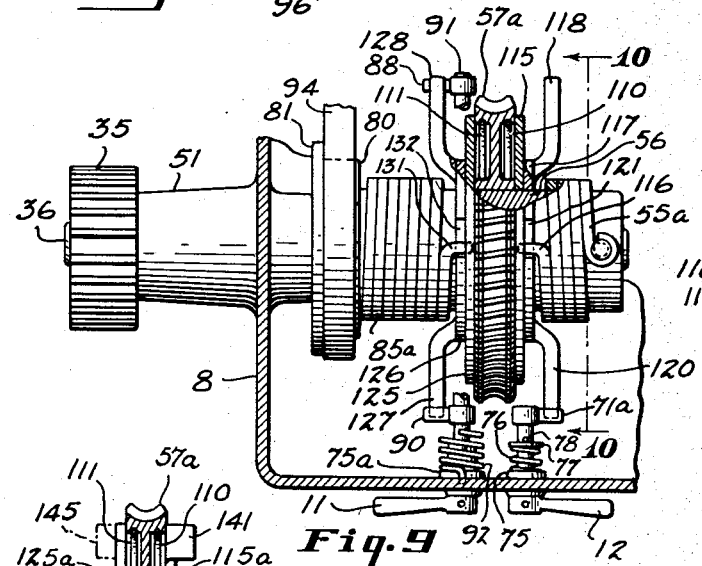
Figure 10:
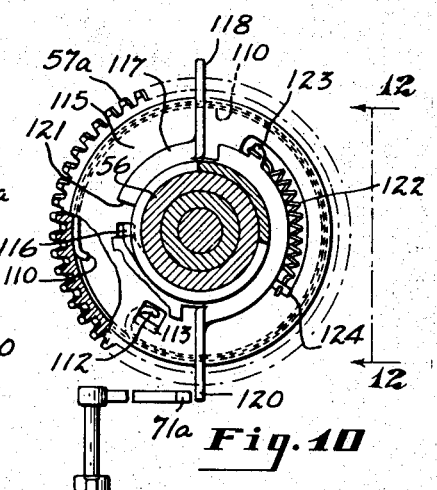
Figures 11, 13:
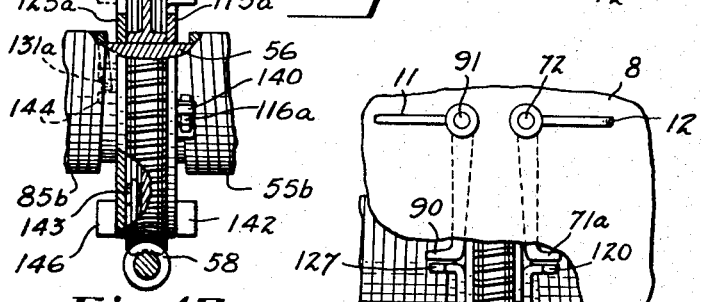
Figure 12:
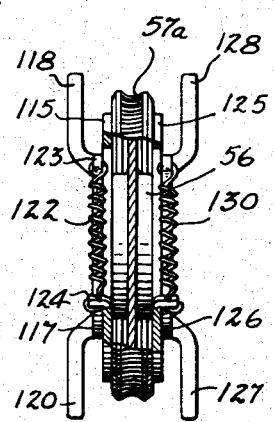
Figures 14, 15:
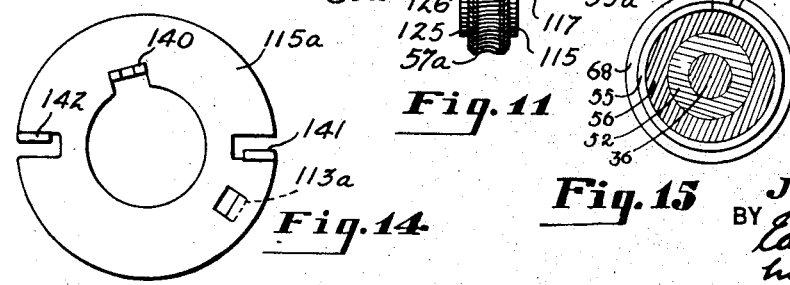

Stated in general terms, this invention comprehends the provision of a clutch employing a helical friction member which is adapted to connect and disconnect the driving and driven parts of the clutch. A portion of the length of the helical member or a separate spring is used to insure the complete release of the clutch when it is disengaged and a continuously acting friction drag is provided to insure instantaneous and positive action of the clutch when it is adjusted to its engaged position. In the drawings, Figure 1 is a side elevational view of an ironing machine illustrative of one embodiment of the invention; Figure 2 is an enlarged sectional view taken on line 2—2, Figure 1, illustrating some of the mechanical details of the machine shown in Figure 1; Figures 3, 4, 5 and 6 are detail sectional views taken on lines 3—3, 4—4, 5—5 and 6—6 of Figure 2 respectively; Figure 7 is an enlarged detail sectional view taken on line 7—7, Figure 2; Figure 8 is an enlarged detail sectional view taken on line 8—8, Figure 2; Figure 9 is an enlarged detail plan view of a modified form of clutch which may be used in place of the clutch shown in Figure 8; Figure 10 is a sectional view taken on line 10—10, Figure 9; Figure 11 is a detail side elevational view of a portion of the structure shown in Figure 9; Figure 12 is a detail side elevational view taken on line 12—12, Figure 10; Figure 13 is a detail side elevational view of a modified form of clutch control; Figure 14 is a plan view of a combined control and drag plate which is used in connection with the device shown in Figure 13; and Figure 15 is a detail sectional view taken on line 15—15, Figure 8.

Referring now to Figure 1, the ironing machine selected for the purpose of illustrating the details of this invention comprises a supporting structure 1 for carrying a padded rotatable roll 2 and a heated ironer shoe 3 which latter two members constitute the ironing elements of the machine, one of which is arranged for relative movement with respect to the other, so that the shoe and the roll may be moved into and out of pressing contact with each other at the will of the operator.

The ironer shoe is carried on the upper end of an arm 4 having associated therewith at its lower end, a supporting bracket 5 carried by the supporting structure 1 of the machine. Means, including a rod 42 housed within the tube 6 and a control lever having a handle 7, are provided for manually shifting the shoe into and out of engagement with the roll and such means constitute a safety release for releasing the shoe from pressing engagement with the roll.

Suitable operating mechanism is housed within a gear case 8 located at one end of the supporting structure 1 for effecting rotation of the roll and for laterally moving the same into and out of pressing contact with the shoe 3. Power for effecting the aforesaid operations is supplied by means of an electric motor 10 located in a lower compartment provided by the casing 8. A small finger-operated lever 11 is carried on the exterior of the case for controlling the lateral and rotational movements of the roll. This control is arranged to be operated by a very light pressure and may be aptly described as a finger-tip control.

A second lever 12, located alongside the lever 11 on the gear case 8, is provided for preventing the rotation of the roll at such times when it is intended for using the machine for pressing operations, in which case, the manipulation of the lever 11 serves only to shift the roll into and out of engagement with the shoe and does not cause the rotation of the roll as is done in the ordinary operation and use of the machine.

Referring now to the sectional view of Figure 2 and the detail views 3, 4, 5 and 6, it will be seen that the roll of the machine is supported entirely from the gear case 8, which has an upper compartment 13 for most of the operating mechanism of the machine. A removable cover plate 14 is provided to permit access to the operating elements housed within the compartment 13.

The gear case 8 has a laterally extending hollow boss 15 in which is rigidly fitted a tube 16, provided with a bracket 23 for rotatably supporting the outer end of a rocker-shaft 22 which supports an upstanding bearing member 17 for the outer end of the roll. The inner end of the roll is carried on a bearing member 18 fixed to a bracket 20 rigidly secured by means of a pin 21 to the rocker-shaft 22, which extends the length of the roll in a position a slight distance below the tube 16. The bearing member 17 has a reduced, laterally offset part 26 at its upper end which is received in a tubular bearing member 27, fixedly carried by the end cap 28 of the roll 2.

The roll is held against axial movement with respect to its supporting bearings by means of a bolt 30 and an associated washer 31 which cooperate with the roll end cap 28 and the bearing member 17 to hold the roll in proper position with respect to its bearings. The bearing member 18 engages with a bearing surface 32 provided by a lateral annular extension formed integrally with an internal gear 33 which may conveniently be formed from a single die-casting. The gear 33 may have a pressed fit in the end of the roll, or it may be fixedly secured at this point by any suitable means such as screws or pins 34.

The roll supporting bearings are carried by the rocker-shaft 22 from a point some distance below the roll axis so that when this shaft is rocked by means which will be described in detail presently, the roll may be shifted into and out of contact with the shoe 3 when the shaft 22 is rocked in one direction or the other. At the same time this takes place, the internal gear 33 is brought into and out of meshing engagement with a gear or pinion 35 fixedly secured to a shaft 36 which is mounted for rotation about a fixed axis.

The pinion 35 serves to drive the roll when the roll is moved laterally into contact with the shoe and when the roll is moved out of contact with the shoe, the gears 33 and 35 are separated from meshing engagement with each other and the power drive of the roll is thus automatically connected and disconnected by the simple expedient of the shifting of the roll.

The outer cover of the roll 2 is in the form of one or more layers of suitable padding 37 and the shoe is provided with a heating element 38 which may for convenience be a resistance-wire heating element which is operated from the same source of electrical current supply as is the driving motor 10 of the machine. A suitable heat insulating cover 40 is provided at the rear of the heating element 38 to prevent the rear side of the shoe 3 from becoming excessively hot and also for the purpose of increasing the transfer of heat to the forward or working face of the shoe.

Referring now particularly to Figures 2 and 8 and some of the detail views, it will be seen that the gear case 8 has a hollow laterally extending boss 51 provided for reception of a tubular bearing member or sleeve 52 which is pressed into the boss 51 so as to form a rigid and fixed part of the gear case. The outer and inner surfaces of the sleeve 52 are smoothly finished to provide bearing surfaces for the parts which will be described presently.

The gear 35 is fixed to one end of the shaft 36 and at its other end a cylindrical driven member 53 is secured to the shaft by means of a pin 54. The pin 54 is secured to one end of a coil spring friction clutch member 55, and as is best shown in Figure 8, the spring 55 comprises a number of turns which are wrapped about the member 53 and an adjacent sleeve 56 which is fixed to a worm gear 57, driven by a worm 58 carried on a shaft 60. A bearing 61 for one end of the shaft 60 as is shown in Figure 2 is formed in a boss 62 carried at one side of the gear case and the other end of the shaft 60 is mounted in a bearing 63 provided by the boss 64, also formed integrally with the gear case.

At the outermost end of the shaft 60 there is fixed a belt pulley 65 for receiving a belt 66 which in turn is engaged by a belt pulley 67 carried by the armature shaft 67a of the motor 10. The worm gear 57 may conveniently be formed from a die-casting which is cast on the sleeve 56. This sleeve is preferably formed from hardened steel so that it will not be apt to wear by reason of the frictional engagement and disengagement with the clutch springs of the machine.

Several turns of the clutch spring 55 extend over the sleeve 56 and this end of the clutch spring is welded or otherwise secured at 69 to one end of three or more turns of a larger spring 68 or non-clutching end portion which is wrapped about the end of the coil spring 55. The other end 70 (see Fig. 4) of the spring 68 is upturned so that it may be engaged by a stop 71 which may be moved into and out of the path of this end of the spring.

The stop 71 is carried on a shaft 72, fixedly secured to the control lever 12, which is located exteriorly of the gear case 8. The lever 12 can be moved to one or the other of two limiting positions, as determined by a pair of spaced stops 73 and 74, formed exteriorly of the gear case and fixed thereto. When the lever occupies its upper position, as shown in Figure 1, the stop 71 will be in the path of the end of the spring 68 and it will serve to hold the clutch spring 55 from driving engagement with the sleeve 56.

The shaft 36 which carries the roll driving gear 35 is thus prevented from rotating and with the control lever 12 in the stated position, the roll can be moved into and out of engagement with the shoe without effecting the rotation of the roll. Normally, however, the lever 12 is in its lower position in contact with the stop 74, in which position, the clutch engaging stop 71 occupies a position outside the path of the end 70 of the clutch spring, so that the clutch spring is in continuous driving engagement with the sleeve 56.

Leakage of oil from the gear case is prevented by means of a suitable packing washer 75 which is maintained in sealing relation around the shaft 72 by a spring 76 which is held against the packing washer 75 by a washer 77 secured in position on the rocker-shaft 72 by means of a pin 78. Viewed from the end of the machine at which the gear case 8 is located, the worm gear 57 rotates in a clockwise direction and the coils of the springs 55 and 68 are wound so that movement in a counterclockwise direction on the end 70 of the spring 68 will tend to uncoil the springs 55 and 68. The spring 68 is provided for the purpose of preventing frictional drag between the clutch parts when they are in disengaged position and when the driving elements of the machine are in operation.

The manner in which this works is as follows: When the stop 71 engages with the upturned end 70 of the spring 68, there is initially built up in the coils of this spring a certain amount of tension and when this tension reaches a predetermined value it serves to disconnect the driving engagement of the spring 55 with the sleeve 56, and after this takes place the tension of the spring 68 then operates to completely release the spring 55 from the sleeve 56.

This is accomplished by reason of the fact that it takes a slightly greater force to effect the disengaging movement of the clutch than it does to hold the clutch parts in their disengaged position, which difference amounts to the difference between the static and kinetic friction of the driving and driven clutch parts; the static friction being of slightly greater value, as is customary, so that the aforesaid results may be accomplished.

As is best shown in Figure 8, the sleeve 56 extends outwardly a considerable distance from each side of the worm gear 57. The portion of the sleeve to the left of the worm gear is provided for selectively driving an eccentric 80. The eccentric 80 is mounted for rotation on the fixed bearing sleeve 52 which is carried by the boss 51 of the gear case. This eccentric may also be formed from a die-casting and it is provided at one edge with a flange 81 and opposite thereto it has an offset hub part 82 of substantially the same shape and dimensions as the adjacent part of the sleeve 56.

A number of teeth 83, as best shown in Figure 7, are provided on one side of the eccentric. The spaces between these teeth are provided for receiving the end 84 of the clutch spring 85, which is provided for effecting selective driving engagement between the sleeve 56 of the worm gear 57 and the eccentric 80.

The clutch spring 85 is of substantially the same construction as the clutch spring 55 and it is secured at one end to an end of an outer spring 86 having a number of turns terminating at its other end with an upturned part 87 (see Fig. 2) which engages with one or the other of a pair of stop arms 88 and 90 which are carried on a shaft 91, which in turn is fixed for movement with the control lever 11. The control lever 11 and the associated stops are normally maintained in position to engage the end 87 of the clutch spring by means of a coil spring 92 which engages at one end with the shaft 91 and at its other end with the gear case 8. As in the case of the springs 55 and 68, the spring 86 forms a non-clutching end portion for the clutch spring 85.

Packing means 75a similar to that described in connection with the rod 72 are provided at the point where the shaft 91 traverses the wall of the gear case. A stop 93 is provided exteriorly of the gear case 8 to maintain the lever 11 in proper position against the tension of the spring 92. The stop arms 88 and 90 are spaced substantially 180° from each other so that the clutch formed in part by the spring 85, may be disengaged after each successive half-turn, provided the lever 11 is released soon after it has been depressed, which is the normal method of operating the machine. The adjustment provided by the teeth 83 permits the shifting of the spring to take care of slight irregularities as may occur between different clutch springs.

The face of the eccentric 80 is engaged by a yoke 94 pivotally connected at 95 to a crank arm 96 which is fixed to the rocker-shaft 22. When the clutch formed in part by the spring 85, is in driving engagement, the eccentric will be rotated approximately 180°, moving from the full line to the dotted line position, as shown in Figure 5 or vice versa as the case may be, and this movement of the eccentric serves to rock the shaft 22 and in this manner swing the bearing members 17 and 18 toward and away from the shoe of the ironer, thus bringing the padded roll and the heated shoe into and out of pressing contact with each other.

The rod 42 associated with the shoe 3, is initially placed under some tension by the operation of the safety release when the shoe is moved to its operative position by the handle 7. This may be readily accomplished by having the shoe supporting arm move into contact with a fixed stop (not shown) as the shoe is moved to its operative position. The lower end of the shoe supporting arm 4 is fixed to the torsion rod 42 as previously stated, and this arm is free to move about the axis of the rod 42 subject to the restraint occasioned by the torsional effort of such rod. When the roll is moved into engagement with the shoe, there is considerable pressure exerted between the contacting surfaces of the roll and the shoe due both to the initial torsion in the rod and the added torsion in the rod caused by the contact pressure between the roll and the shoe.

When the roll is shifted away from the shoe, the torsion of the spring rod 42 tends to speed the movement of the roll away from the shoe during the initial part of such movement, and there is a strong tendency for the roll shifting eccentric to over-run the driving mechanism, causing the machine to be noisy and jerky in operation.

In the present construction a cam surface 98 (see Figs. 5 and 7) is formed on one side of the eccentric member for the purpose of quieting the operation of the machine. This surface is arranged so that when the roll is moved away from the shoe, the cam surface comes into engagement with a brake member 97 which is urged against the cam face by means of a spring 99, pressing against a washer 100, fixed on a pin 102, which transfers the tension of the spring to the brake member 97, so that considerable pressure is exerted between the cam face 98 and the brake member 97 when they move into engagement with each other.

In the modified form of clutch construction shown in Figures 9 to 12, the spring 68 associated with the clutch spring 55 and the spring 86 associated with the clutch spring 85 are dispensed with and a different arrangement which operates in substantially the same manner is substituted for accomplishing the result which is accomplished with the springs 68 and 86. Many of the elements shown in Figures 9 to 12 are substantially or identically the same as the correspondingly numbered elements previously described.

In the modified form of clutch construction, a worm gear 57a fixed to a sleeve 56 constitutes the driving part of the clutch. The sides of this gear are grooved for receiving annular drag or clutch-energizer springs 110 and 111. The drag spring 110 frictionally engages with the gear 57a and at its end 112 it is attached to an offset part 113 of a drag or clutch-energizer plate 115 which is notched for snugly receiving the end 116 of the clutch spring 55a.

The drag plate 115 is freely mounted upon the driving sleeve 56. A similarly mounted control plate 117 is positioned alongside of the drag plate 115. The control plate 117 is provided with a pair of stop arms 118 and 120 adapted to be engaged by a stop 71a, similar to the one previously described and which is operatively connected to the control lever 12.

The control plate 117 is notched at 121 for loosely receiving the end 116 of the clutch spring 55a which end is rather closely fitted into an aperture of the drag plate 115, as shown best in Figure 9. The control plate 117 and the drag plate 115 are operatively connected to each other by means of a coil spring 122, one end of which is connected to the part 123 of the control plate and the other end of which is connected to the part 124 of the drag plate.

The driving and driven parts of the mechanism illustrated in Figures 10 and 11 are adapted to rotate in a clockwise direction. When the stop 71a is moved into engagement with one or the other of the arms 118 and 120, the spring 122 begins to exert a pull upon the drag plate 115, and when this pull is sufficient to overcome the frictional engagement of the spring 55a with the driving clutch sleeve 56, the clutch will become disengaged and the extra pull of the spring 122, which is necessary to effect the initial disengaging operation of the clutch, will be utilized in further uncoiling the clutch spring 55a to completely disengage it from the driving sleeve 56 and thus stop the operation of the gear 35.

In the event that the tension of the spring 122 is not sufficient to effect the disengagement of the clutch spring 55a, positive disengagement of the clutch spring will be effected when the end part 116 of the spring 55a contacts with the end portion of the notch 121, which ordinarily loosely receives this end of the clutch spring.

The control for the clutch of the eccentric 80 is substantially the same and it operates in an identical manner to the clutch just described. The eccentric clutch control includes a drag or clutch-energizer plate 125 and a control plate 126 having stop arms 127 and 128 which are adapted for engagement with the stops 88 and 90 of the control which is operated by the lever 11. The clutch and control plates are connected to each other by means of a coil spring 130 which operates in a manner similar to the spring 122. The drag plate 125 is apertured for closely receiving the end 131 of the clutch spring 85a and the control plate also is notched at 132 for loosely receiving this end of the clutch spring.

In both forms of the invention, the clutch release operates in substantially the same manner by utilizing the tension of a resilient member to substantially effect complete disengagement of a friction clutch employing a helical spring which is adapted to wrap around a driving member in effecting the engagement of the clutch.

When either one of the clutches just described in connection with Figures 9 to 12 is released for engagement, the associated drag spring working through its drag plate, assists in tightly wrapping the clutch spring around the driving part of the device. It is, of course, understood that the clutch spring energizing feature of the invention could be incorporated in the form of clutch illustrated in the earlier views of the drawings by arrangement much the same as shown in Figures 13 and 14 which will be described presently.

Figures 13 and 14 illustrate a slightly modified form of the invention in which the control and drag or energizer plates used in connection with the device illustrated in Figures 9 to 12 are combined in a single plate and the special provisions for insuring complete release of the clutch are dispensed with in the latter form of the invention.

The clutch structure illustrated in Figures 13 and 14 comprises a clutch sleeve 56, a worm gear 57a rigid therewith and a worm 58 for driving the worm gear 57a. A pair of helical clutch springs 55b and 85b are associated with the clutch sleeve 56. A pair of drag or clutch energizer springs 110 and 111 are in contact with a grooved portion of the worm gear 57a. The spring 110 engages with an offset part 113a of a plate 115a which is rotatably mounted upon the sleeve 56 and the spring 111 engages with a similarly formed part 143 formed on the plate 125a which is rotatably mounted on the sleeve 56 at the side of the gear 57a opposite to the plate 115a.

The foregoing elements are not greatly different from the structure previously described in connection with the form of clutch shown in Figures 9 to 12. In the present case, the drag plates also serve as control plates and they are provided with offset portions 141 and 142 for the plate 115a and offset portions 145 and 146 for the plate 125a. The clutch spring 55b at one end engages in the slotted portion of an offset part 140 of the plate 115a and the spring 85b at one end engages with a similarly formed offset part 144 of the plate 125a.

The operation of this clutch is not greatly different from the clutches previously described. During the rotation of the structure shown in Figure 13, the disengagement of one or the other of the clutches may be effected by moving a stop (not shown) into the path of one or the other of the members 141 and 142 of the plate 115a or one or the other of the members 145 and 146 of the plate 125a.

When the movement of either one of the plates 115a or 125a is arrested, the free end of the corresponding clutch spring is held against rotation and thus unwound from the driving clutch sleeve 56. When one or the other of the plates is released for movement, its corresponding drag spring will tend to wrap the associated clutch spring around the driving sleeve 56 and in this manner effect the engagement of the clutch.

The arrangement just described illustrates the manner in which the clutch-energizing device may be used without the clutch-releasing device in a simple form of clutch mechanism which may be used in many cases where special provisions for insuring the complete release of the clutch are not necessary or desirable.

The foregoing description and the accompanying drawings to which it relates, describes what might be termed the preferred modes of practicing the invention. It is to be clearly understood, however, that the invention includes each and every novel feature or combination of novel features herein disclosed, subject only to the restrictions of the prior art, and that the invention may assume other forms and it is not to be limited to the particular and specific structure shown and described herein.

Having thus described my invention what I claim is:

1. A selectively disengageable friction clutch comprising driving and driven parts, a coil spring fixedly secured at one end to one of said parts and tensioned so as to frictionally engage the other of said parts, and stop means for releasing said spring from such frictional engagement, the unsecured end of said spring having resilient means connected thereto and engaged and initially tensioned by said stop means as a step prior to effecting any disengagement of the clutch.

2. A selectively disengageable friction clutch comprising driving and driven parts, a coil spring fixedly secured at one end to one of said parts and tensioned so as to frictionally engage the other of said parts, and means engaging said spring for releasing such frictional engagement, said spring terminating at its other end in one or more turns spaced at all times from said driving clutch part and arranged to be initially tensioned and then to effect disengagement of the clutch.

3. A friction clutch mechanism, having, in combination, a constantly rotating driving element and a driven element, resilient means including a pair of concentrically arranged springs joined to each other at one of their ends for selectively effecting frictional driving connection between said elements, and control means for effecting the disengagement of said resilient means with respect to one of said elements, said control means operating to initially tension the outer of said springs as a step prior to disengaging the said resilient means from driving engagement with said driving element, such initial tension operating to effect substantially complete disengagement between said driving clutch element and said resilient means.

4. A friction clutch mechanism, having, in combination, a driving and a driven element, a resilient member for effecting frictional driving connection between said elements having a non-clutching end portion adapted to be initially tensioned before disengagement of said resilient member with respect to one of said elements is effected, and means for initially tensioning the end portion and then effecting the disengaging movement of said resilient member whereby to completely disengage the clutch and thereby substantially prevent friction between said member and said driving element and heating of the clutch when in its disengaged position.

5. A friction clutch comprising, a driving member having a cylindrical friction face, a driven member coaxial with said driving member, a helical spring permanently attached at one end to said driven member and extending in coiled relation about the friction face of said driving member, a drag plate rotatably mounted on said driving member, a drag spring attached to said plate and frictionally contacting said driving member, means for connecting the free end of said helical spring to said drag plate, a control plate rotatably mounted on said driving member and having an apertured portion for loosely receiving the free end of said helical spring, a spring connecting said control plate to said drag plate, a stop on said control plate, and a member for engaging said stop and thus disengaging said clutch, the spring connection between said control plate and said drag plate operating to maintain the helical clutch spring free of the friction face of said driving member.

6. A friction clutch comprising, a driving member having a cylindrical friction face, a driven member coaxial with said driving member, a helical spring permanently attached at one end to said driven member and extending in coiled relation about the friction face of said driving member, a drag plate rotatably mounted on said driving member, a circular drag spring attached to said plate and frictionally gripping said driving member, means for connecting one end of said helical spring to said drag plate, and means for preventing the rotation of said drag plate and thus disengaging the clutch, said drag plate when released for movement operating to assist in wrapping said helical spring about the friction face of said driving member.

7. A friction clutch comprising, a driving member having a cylindrical friction face, a driven member coaxial with said driving member, a helical spring permanently attached at one end to said driven member and extending in coiled relation about the friction face of said driving member, a drag plate rotatably mounted on said driving member, friction means comprising an annular spring engaging said driving member for lightly connecting said plate to said driving member, means for connecting the free end of said helical spring to said drag plate, and means for preventing the rotation of said drag plate for disengaging the clutch, said drag plate when released for movement operating to assist in wrapping said helical spring about the friction face of said driving member.

8. A friction clutch comprising, a driving member having a cylindrical friction face, a driven member coaxial with said driving member, a helical spring permanently attached at one end to said driven member and extending in coiled relation about the friction face of said driving member, a drag plate rotatably mounted on said driving member, a drag spring attached to said plate and frictionally contacting said driving member, means for connecting the free end of said helical spring to said drag plate, a control plate rotatably mounted on said driving member and having an apertured portion for loosely receiving the free end of said helical spring, a resilient means connecting said control plate to said drag plate, a stop on said control plate, and a member for engaging said stop and thus disengaging said clutch, the resilient connection between said control plate and said drag plate operating to maintain the helical clutch spring free of the friction face of said driving member.

9. A friction clutch comprising, a driving member having a cylindrical friction face, a driven member coaxial with said driving member, a helical spring permanently attached at one end to said driven member and extending in coiled relation about the friction face of said driving member, a drag plate rotatably mounted on said driving member, an annular drag spring attached at one end to said plate and frictionally contacting said driving member throughout the major portion of its length, means for connecting the free end of said helical spring to said drag plate, and means including a resilient element for preventing the rotation of said drag plate and thus completely disengaging the clutch, said drag plate when released for movement operating to assist in wrapping said helical spring about the friction face of said driving member.

10. A friction clutch comprising, a driving member having a cylindrical friction face, a driven member coaxial with said driving member, a helical spring permanently attached at one end to said driven member and extending in coiled relation about the friction face of said driving member, a drag plate rotatably mounted on said driving member, an annular spring interposed between said drag plate and driving member, said spring having a fixed connection with said drag plate and a frictional connection with said driving member, means for connecting the free end of said helical spring to said drag plate, and means for preventing the rotation of said drag plate and thus disengaging the clutch, said drag plate when released for movement operating to assist in wrapping said helical spring about the friction face of said driving member.

11. A friction clutch comprising, a driving member having a cylindrical friction face and an annular grooved portion, a driven member coaxial with said driving member, a helical spring permanently attached at one end to said driven member and extending in coiled relation about the friction face of said driving member, a drag plate rotatably mounted on said driving member, a stop for engaging the free end of said spring and thus disengaging the clutch, and friction means seated in the grooved portion of said driving member cooperating with said drag plate to wind said spring about said driving member when the spring is released by said stop.

JOHN W. RACKLYEFT.